US009798961B2

(12) United States Patent
Yasui

(10) Patent No.: US 9,798,961 B2
(45) Date of Patent: Oct. 24, 2017

(54) PRINTER COLOR CALIBRATING METHOD TO SUPPRESS COLOR VARIATION BETWEEN DEVICES

(71) Applicant: SEIKO EPSON CORPORATION, Tokyo (JP)

(72) Inventor: Masashi Yasui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/596,909

(22) Filed: Jan. 14, 2015

(65) Prior Publication Data

US 2015/0213337 A1     Jul. 30, 2015

(30) Foreign Application Priority Data

Jan. 24, 2014   (JP) ................................. 2014-011062

(51) Int. Cl.
*G06K 15/02*     (2006.01)
*H04N 1/60*     (2006.01)

(52) U.S. Cl.
CPC ....... *G06K 15/027* (2013.01); *G06K 15/1878* (2013.01); *H04N 1/6055* (2013.01); *H04N 1/6044* (2013.01)

(58) Field of Classification Search
None
See application file for complete search history.

(56) References Cited

U.S. PATENT DOCUMENTS

| 5,805,213 A | * | 9/1998 | Spaulding | H04N 9/67 348/222.1 |
| 5,818,960 A | * | 10/1998 | Gregory, Jr. | H04N 1/6055 345/442 |
| 5,953,136 A | * | 9/1999 | Kraft | G03B 27/735 358/1.9 |
| 6,172,771 B1 | | 1/2001 | Ikeda et al. | |
| 6,671,067 B1 | * | 12/2003 | Adam | H04N 1/00068 358/1.6 |

(Continued)

FOREIGN PATENT DOCUMENTS

| JP | 10-294867 A | 11/1998 |
| JP | 2003-107833 A | 4/2003 |

(Continued)

OTHER PUBLICATIONS

Machine translation of Japanese Appl. No. 2012-009921, published Jan. 2012.*

*Primary Examiner* — Paul F Payer
(74) *Attorney, Agent, or Firm* — Global IP Counselors, LLP

(57) ABSTRACT

A printer color calibration method includes obtaining first chart printing material by performing the chart printing with a first printer, setting first color data by obtaining the color data measuring the first chart printing material with a second printer, obtaining second chart printing material by performing the chart printing with the second printer, setting second color data by obtaining the color data measuring the second chart printing material with the second printer, and obtaining correction data that is used by the second printer in order for printing output of the second printer to substantially match with printing output of the first printer based on the first color data and the second color data.

7 Claims, 15 Drawing Sheets

(56) References Cited

U.S. PATENT DOCUMENTS

| | | | |
|---|---|---|---|
| 7,411,700 B2* | 8/2008 | Johnson | H04N 1/6055 358/1.9 |
| 9,098,782 B2* | 8/2015 | Uratani et al. | |
| 2003/0049040 A1 | 3/2003 | Tezuka et al. | |
| 2013/0106935 A1 | 5/2013 | Hoshii | |

FOREIGN PATENT DOCUMENTS

| JP | 2012-009921 A | 1/2012 |
|---|---|---|
| JP | 2013-094977 A | 5/2013 |

* cited by examiner

| Gradient Value In Printing Data | First Color Data | Second Color Data | Difference |
|---|---|---|---|
| 50 | 50 | 45 | −5 |
| 100 | 100 | 90 | −10 |
| 150 | 150 | 140 | −10 |
| 200 | 200 | 195 | −5 |

Fig. 11

| Gradient Value In Printing Data | Second Color Data | First Color Data | Difference |
|---|---|---|---|
| 50 | 50 | 45 | −5 |
| 100 | 100 | 90 | −10 |
| 150 | 150 | 140 | −10 |
| 200 | 200 | 195 | −5 |

Fig. 14

PRINTER COLOR CALIBRATING METHOD TO SUPPRESS COLOR VARIATION BETWEEN DEVICES

CROSS-REFERENCE TO RELATED APPLICATIONS

This application claims priority to Japanese Patent Application No. 2014-011062 filed on Jan. 24, 2014. The entire disclosure of Japanese Patent Application No. 2014-011062 is hereby incorporated herein by reference.

BACKGROUND

Technical Field

The present invention relates to a printer color calibrating method where it is possible to acquire color data by providing a sensor which detects color information.

Related Art

There are times when there is a necessity to suppress color variation between two devices in a case where, for example, two printers are being used. Typically, suppressing of color variation between devices is attempted by performing color calibration on the premise of standard devices provided by manufactures for each of the printers. However, there are times when deviations in color may occur in each of the two printers in opposite directions for the standard devices provided by manufactures. In this case, it is not limited to deviations in color between the two printers being necessarily within the range of original margin of errors even if the deviations in color between each of the printers and standard devices provided by manufactures are eliminated.

A technique is disclosed as shown in JP-A-2012-009921 (PTL 1) where a reference device is not the standard devices provided by manufactures and one of the two devices is used as the reference device in order to restrict color variation between the two devices.

SUMMARY

It is not possible for the technique shown in PTL 1 to be used in a case where each user does not possess a colorimeter.

It is possible to use a color measurement result for one printer in the color calibration of another printer by using an inbuilt colorimeter in a case where a colorimeter which has a sufficiently high color measuring capabilities is provided for each of the printers. However, since it is costly for high precision inbuilt colorimeters to be mounted in each printer, this is not necessarily a realistic measure. In addition, having inbuilt colorimeters which are able to be used in color calibration for other printers is the same as each user possessing a colorimeter.

In recent years, a technique is known where colors are measured using a simple sensor, but the color measuring capacity is not sufficient in the case where a simple sensor is used and it is a given that deviations between devices for each sensor are considerable. For this reason, it is not realistically possible to use color measurement results for one printer in the color calibration for another printer.

The present invention provides a printer color calibration method which suppresses color variation between devices to a minimum when possessing a printer which is provided with a simple sensor.

The present invention is a printer color calibration method for a printer that is configured to perform chart printing in which designated color patches are printed at a plurality of designated positions on a medium, and that is configured to acquire color data by obtaining color information by measuring each patch using a sensor that detects color information, the method including obtaining first chart printing material by performing the chart printing with a first printer, setting first color data by obtaining the color data using the first chart printing material with a second printer, obtaining second chart printing material by performing the chart printing with the second printer, setting second color data by obtaining the color data using the second chart printing material with the second printer, and obtaining correction data that is used by the second printer in order for printing output of the second printer to substantially match with printing output of the first printer based on the first color data and the second color data.

In this configuration, the first color data is set by obtaining the color data using the first chart printing material with the second printer due to the first chart printing material being obtained by performing chart printing with the first printer. Next, the second color data is set by obtaining the color data using the second chart printing material with the second printer due to the second chart printing material being obtained by performing chart printing with the second printer.

Since the first color data and the second color data are both obtained with the second printer, there is no effect even if color variation between devices of the sensor in the first printer and the sensor in the second printer is considerable. After this, correction data which is used by the second printer is obtained in order for the printing output of the second printer to substantially match with the printing output of the first printer based on the first color data and the second color data. If chart printing is performed based on the same printing data and the first color data and the second color data are obtained using the same sensor, it is possible to obtain correction data for matching.

According to the printer color calibration method of the present invention, it is possible to optimally suppress color variation between devices in printers in practice even in a case where color variation between devices of the sensor in the first printer and the sensor in the second printer is considerable.

BRIEF DESCRIPTION OF THE DRAWINGS

Referring now to the attached drawings which form a part of this original disclosure:

FIG. 11 is a table illustrating differences in first color data and second color data;

FIG. 14 is a table illustrating differences in first color data and second color data.

DETAILED DESCRIPTION OF EMBODIMENTS

Embodiments of the present invention will be described below based on the diagrams.

Figure 1:
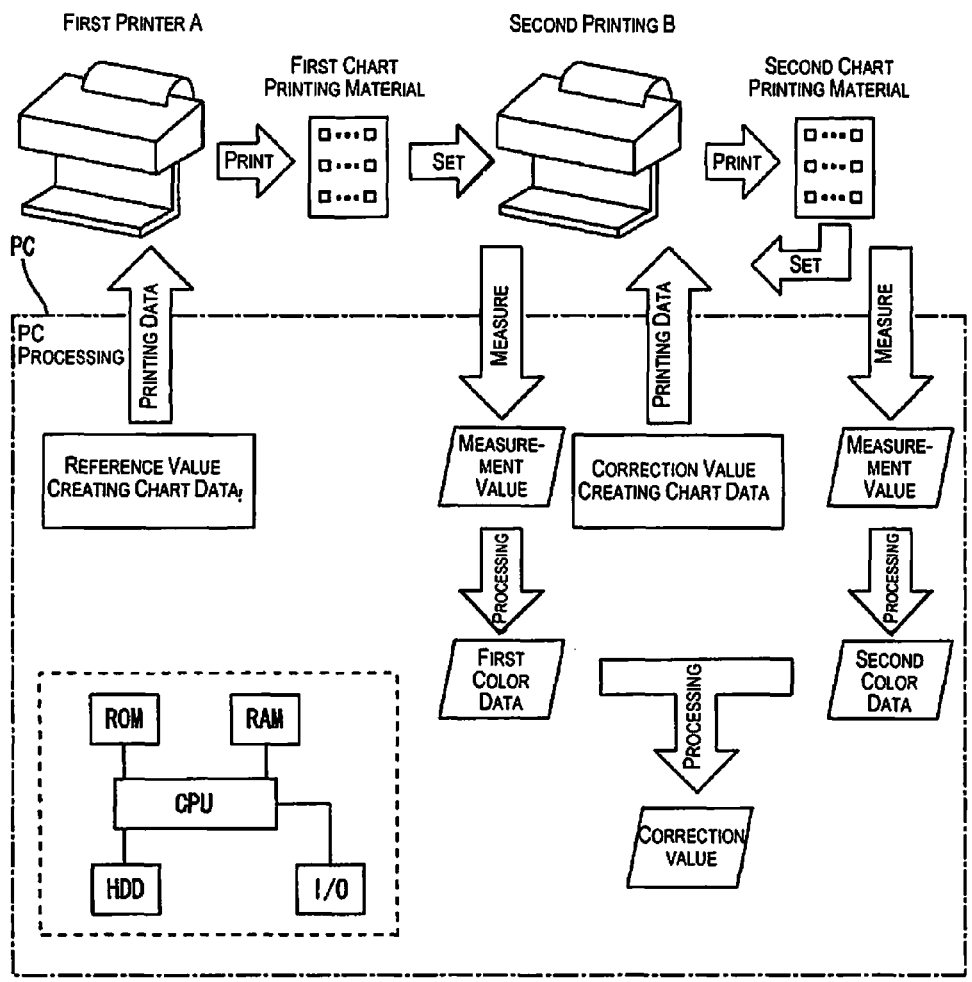
FIG. 1 is a schematic diagram illustrating a printer color calibration method.

FIG. 1 schematically illustrates a printer color calibration method according to an embodiment of the present invention. As shown in FIG. 1, printer color calibration is realized using a first printer A, a second printer B, and a PC which executes designated processing.

In the present invention, a printer is used which is able to perform chart printing where patches of designated colors are printed at a plurality of designated positions on a medium and the color information is acquired and color information is acquired by measuring the color for each patch using a sensor which detects color information. The sensor may be mounted so as to acquire color tone and density and may be mounted so as to detect only density.

Figure 2:
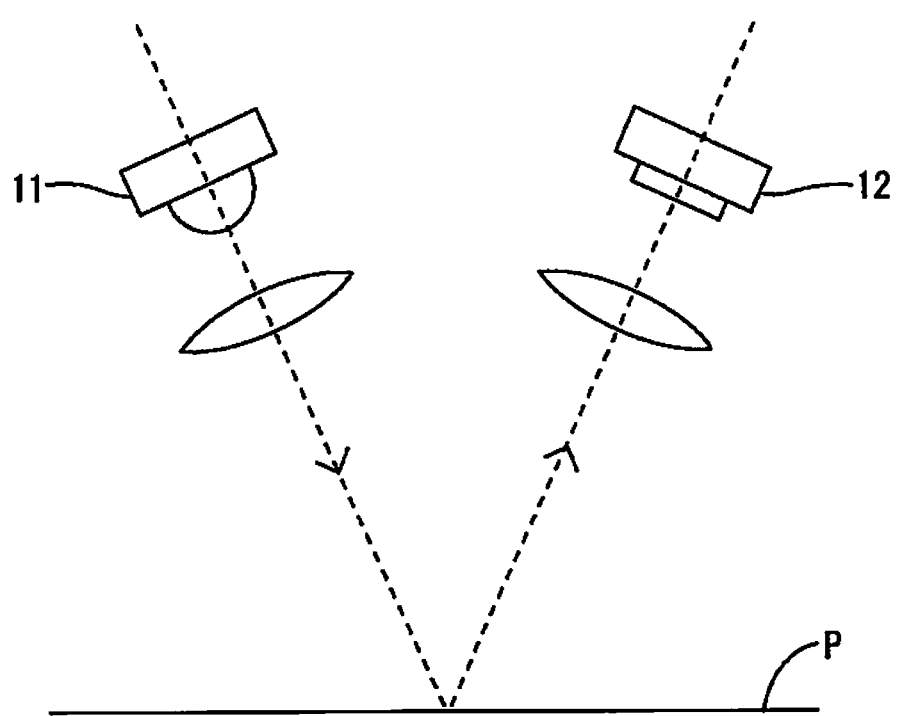
FIG. 2 is an outline diagram illustrating illumination and a sensor which measures density.

FIG. 2 is an outline diagram illustrating illumination and a sensor which measures density.

Density in this case is information which is acquired based on the strength of reflected light in a case where illumination is applied. As shown in the diagram, an LED 11 is used in the illumination and illumination light is irradiated toward a narrow designated range of a medium P. Then, the light which is reflected from the medium P is received by a density sensor 12 and the strength of the light is output by being converted to an electrical strength. Here, the electrical strength is represented as a voltage or a current and it is possible to obtain the electrical strength as a digital vale due to A/D conversion or the like after being converted to a current or a voltage. In the present embodiment, an LED is used but using another illumination would not be problematic.

Figure 3:
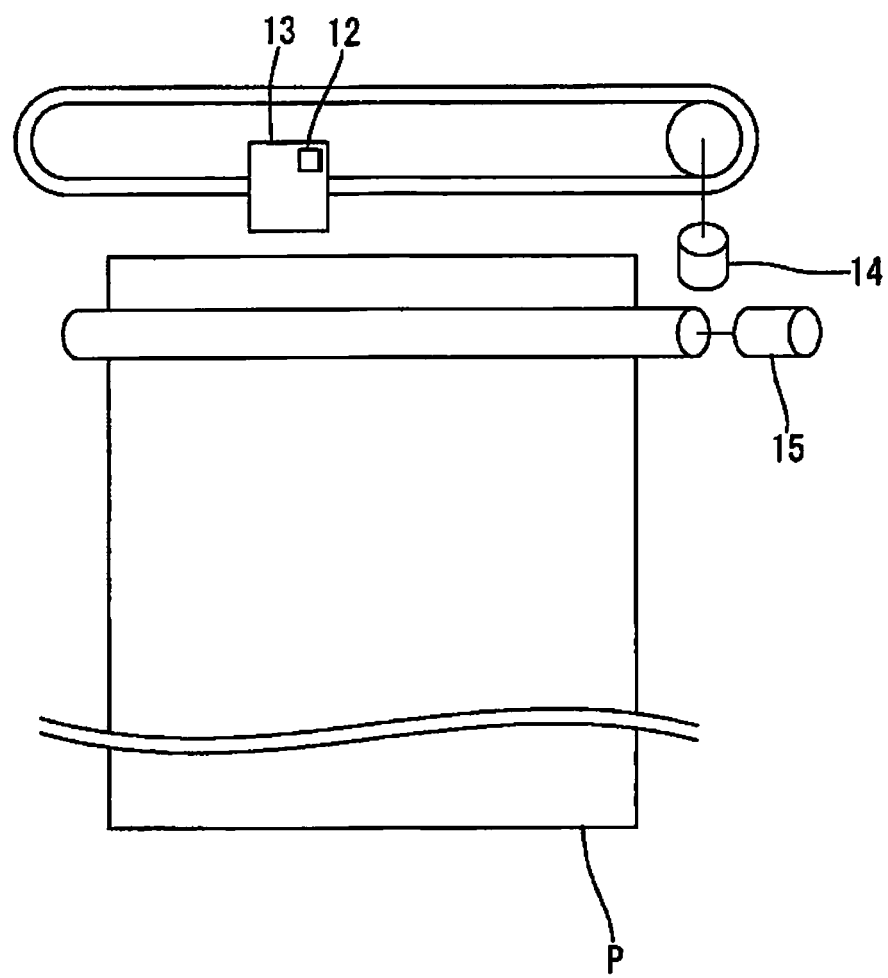
FIG. 3 is an outline diagram illustrating a method for mounting a sensor in a case of a serial printer.

FIG. 3 is an outline diagram illustrating a method for mounting the density sensor 12 in a case of a serial printer.

In FIG. 3, a printing head 13 is able to move back and forth using a carriage motor 14 in a direction which intersects with a medium feeding direction and the density sensor 12 is built into the printing head 13. The printing head 13 is able to move two dimensionally in practice above the medium P using the carriage motor 14 and a paper feeding motor 15.

In a case of chart printing where a plurality of patches are printed on the medium P based on different printing data, it is possible for the density sensor 12 to move to arbitrary patch positions on the chart by appropriate paper feeding and carriage movement being performed if a chart which is printing material is set in a serial printer. Then, the LED 11 emits light when opposing arbitrary patches and electric signals which correspond to the strength of the reflected light are output using the density sensor 12. Then, density data (density information) which are digital values due to the electric signals being A/D converted are obtained.

Patch position information and patch color information are associated at the point in time of chart printing the patches. Accordingly, it is possible to obtain color tone information based on the patch position information. By obtaining density information in addition to color tones, it is able to be used as color data. In this manner, it is possible to acquire color data based on the position information for each patch and the density information for each patch due to the position information being acquired along with acquiring the density information by measuring the density for each patch in chart printing using the density sensor 12 while moving the medium P and the density sensor 12. Here, cases where the medium P and the density sensor 12 are moved at the same time are included and cases where the medium P and the density sensor 12 are sequentially moved are included.

Figure 4:
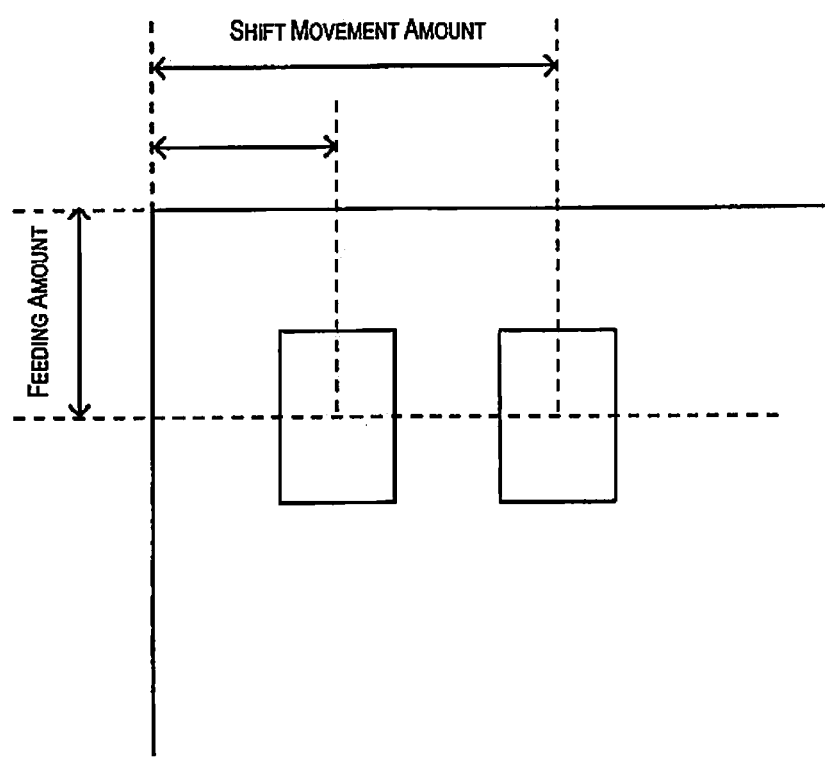
FIG. 4 is an outline diagram illustrating a relationship between chart printing and position information.

FIG. 4 is an outline diagram illustrating a relationship between chart printing and position information. It is possible to specify the positions for each patch based on the feeding amount of the medium P and the shift movement amount of the printing head 13. It is possible to specify this based on drive control data with regard to the carriage motor 14 and drive control data with regard to the paper feeding motor 15. Accordingly, it is possible to construct color data in the serial printer based on drive control data with regard to the carriage motor 14, drive control data with regard to the paper feeding motor 15, and density data from the density sensor 12.

Figure 5:
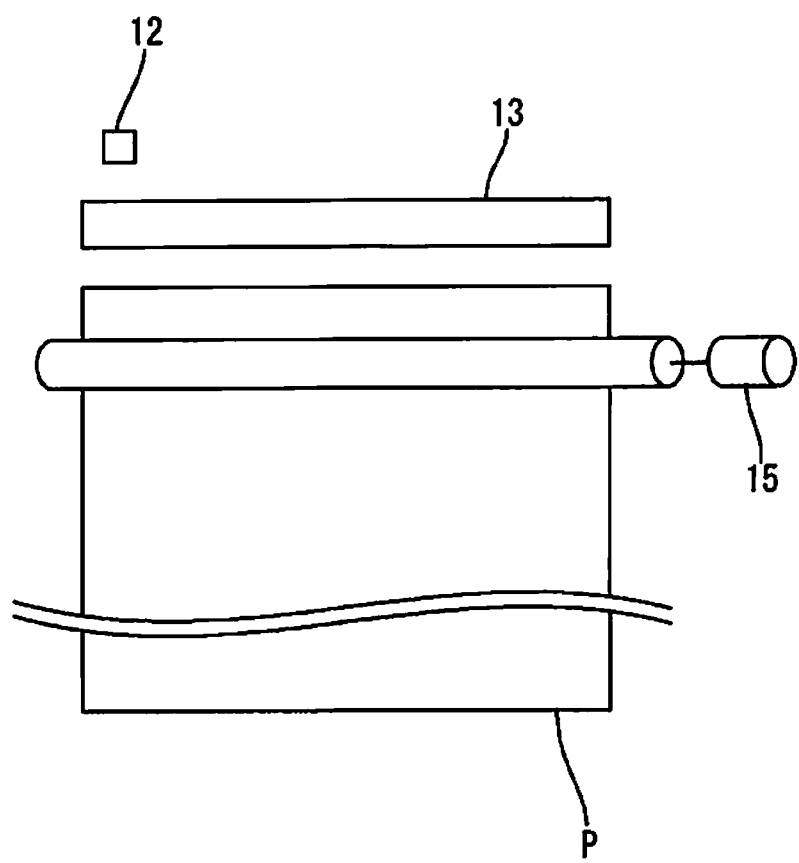
FIG. 5 is an outline diagram illustrating a method for mounting a sensor in a case of a line printer.

Next, FIG. 5 is an outline diagram illustrating a method for mounting a sensor in a case of a line printer.

In a case of a line printer, the paper feeding motor 15 is provided in the same manner as for the serial printer, but the carriage motor 14 is not provided since the printing head 13 which spans across the entire width of the medium P is provided. For this reason, in a case where one of the density sensors 12 is provided, opposing the density sensor 12 is just designated shift position on the medium P. Accordingly, a plurality of patches are printed to line up in one row in the shift positions on the medium P. If different density patches with different color tones are chart printed to line up in one row, it is possible to acquire color tone information based on the feeding amount which is the patch position information and it is possible to use the color tone information as color data by obtaining information on densities along with color tone.

Figure 6:
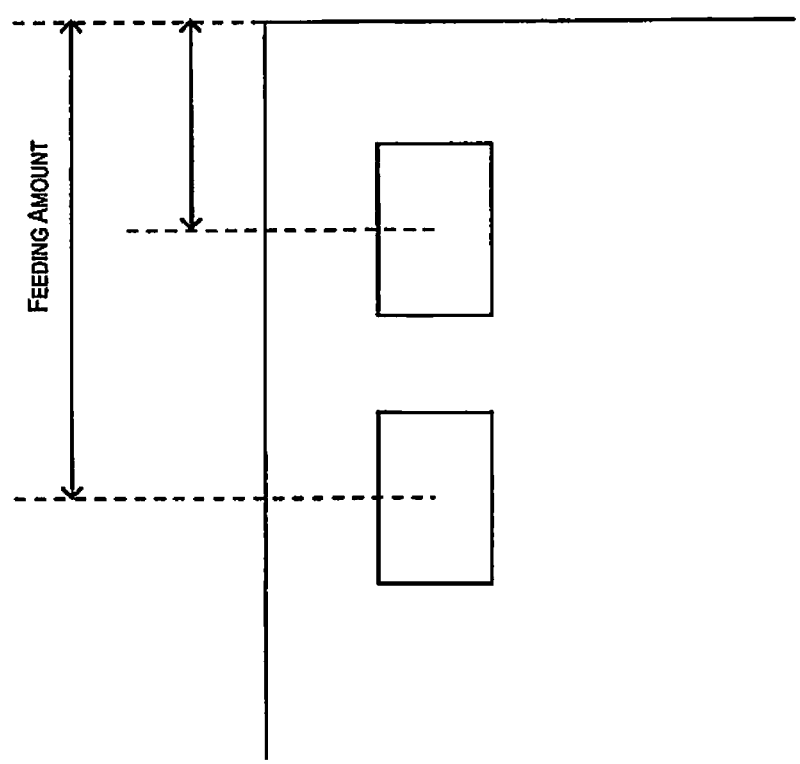
FIG. 6 is an outline diagram illustrating a relationship between chart printing and position information.

FIG. 6 is an outline diagram illustrating a relationship between chart printing and position information in the case of a line printer. It is possible to specify the positions for each patch based on the feeding amount of the medium P. It is possible to specify this based on drive control data with regard to the paper feeding motor 15. Accordingly, it is possible to construct color data in a line printer based on drive control data with regard to the paper feeding motor 15 and density data from the density sensor 12.

Here, in the case of a line printer, the density sensors 12 are arranged to be dedicated to each ink in a plurality of shift positions and it is possible to print only patches of specific ink at positions which oppose each of the density sensors 12.

Other than this, it is possible arrange a guide which specifies the chart position information on, for example, the left and right of the chart. It is possible to specify the chart position information by detecting the guide.

Figure 7:
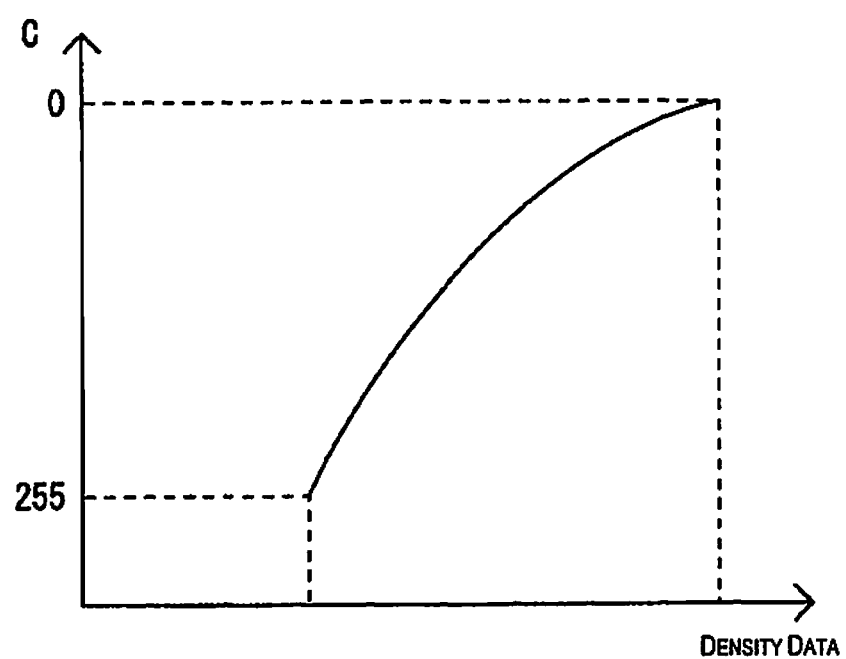
FIG. 7 is a graph illustrating a relationship between color data and densities of C ink.
Figure 8:
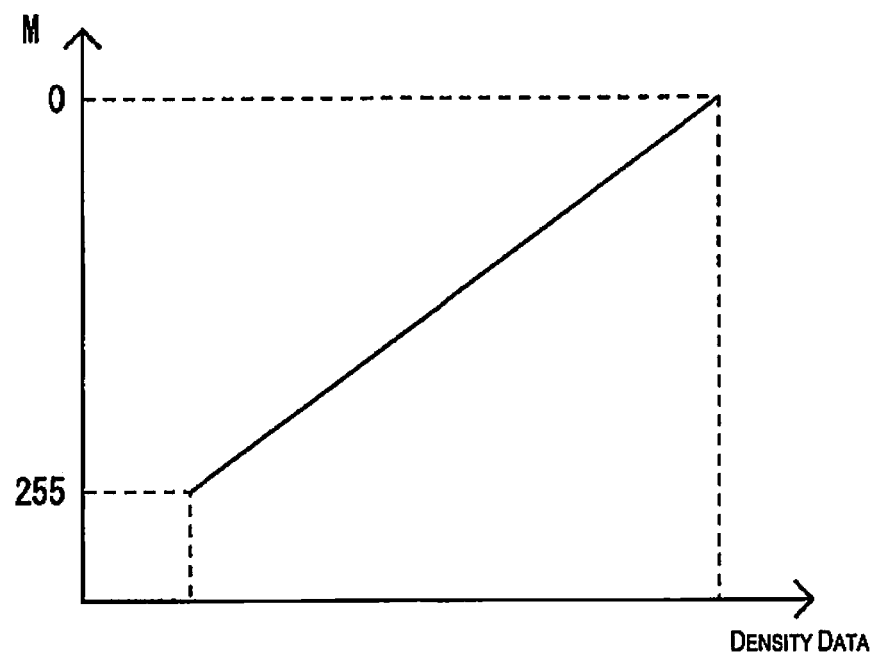
FIG. 8 is a graph illustrating a relationship between color data and densities of M ink.
Figure 9:
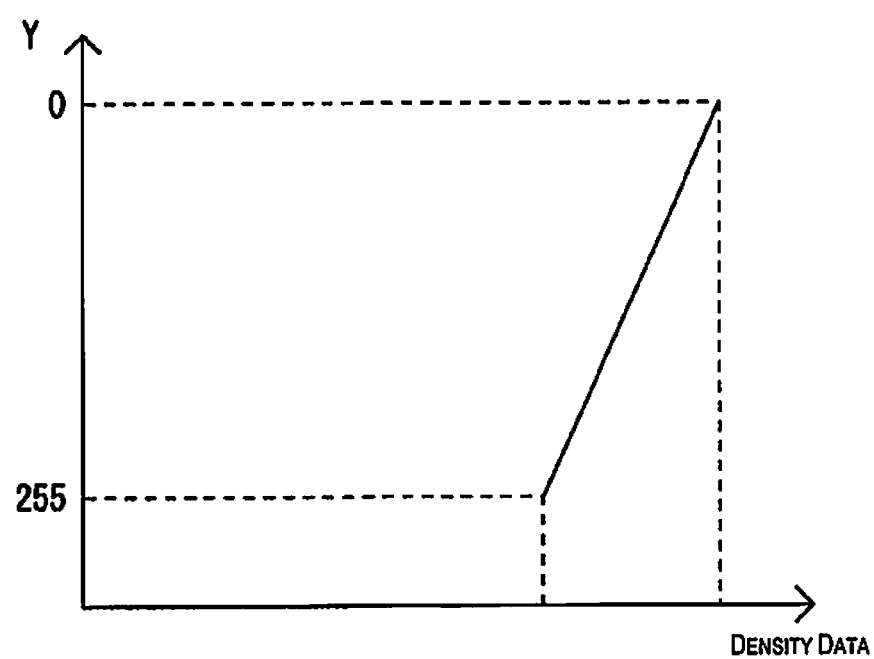
FIG. 9 is a graph illustrating a relationship between color data and densities of Y ink.

FIG. 7 to FIG. 9 are graphs illustrating a relationship between color data and density of patches of cyan ink, magenta ink, and yellow ink.

The layout of the chart printing and the printing data are not particularly limited, but, as an example, patches of designated sizes are printed by preparing a plurality of gradients of printing data using each single color of cyan ink, magenta ink, and yellow ink. Since printing location is obtained as position information, it is possible to distinguish which correspond to which ink with which gradient value when density data is obtained from the density sensor 12.

Since reflected light is typically weak if the density is not high, there is a relationship where the gradient value which corresponds to the patch density increases as the reflected light is weaker (as the density data is lower) and the gradient value which corresponds to the patch density decreases as the reflected light is stronger (as the density data is higher). Here, the strength of the reflected light changes for each of cyan ink, magenta ink, and yellow ink. In addition, the strength of the reflected light is the same for any of the inks in a case where the gradient value is zero since it is just the color of paper.

Assuming this relationship, the density data is the highest for any of the inks is the case when the gradient value is zero and the density data is reduced for all of the inks as the gradient value increases when referencing FIG. 7 to FIG. 9. Since the strength of the reflected light has the order of magenta ink>cyan ink>yellow ink when the gradient values are the same, the density data gradually increases to a maximum gradient value with the order of magenta ink<cyan ink<yellow ink. The shape of the graph from the highest gradient value to the lowest gradient value is different for each of the inks. Here, it is possible to simplify the processing by representing the shape of the graphs with a specific function.

Figure 10:
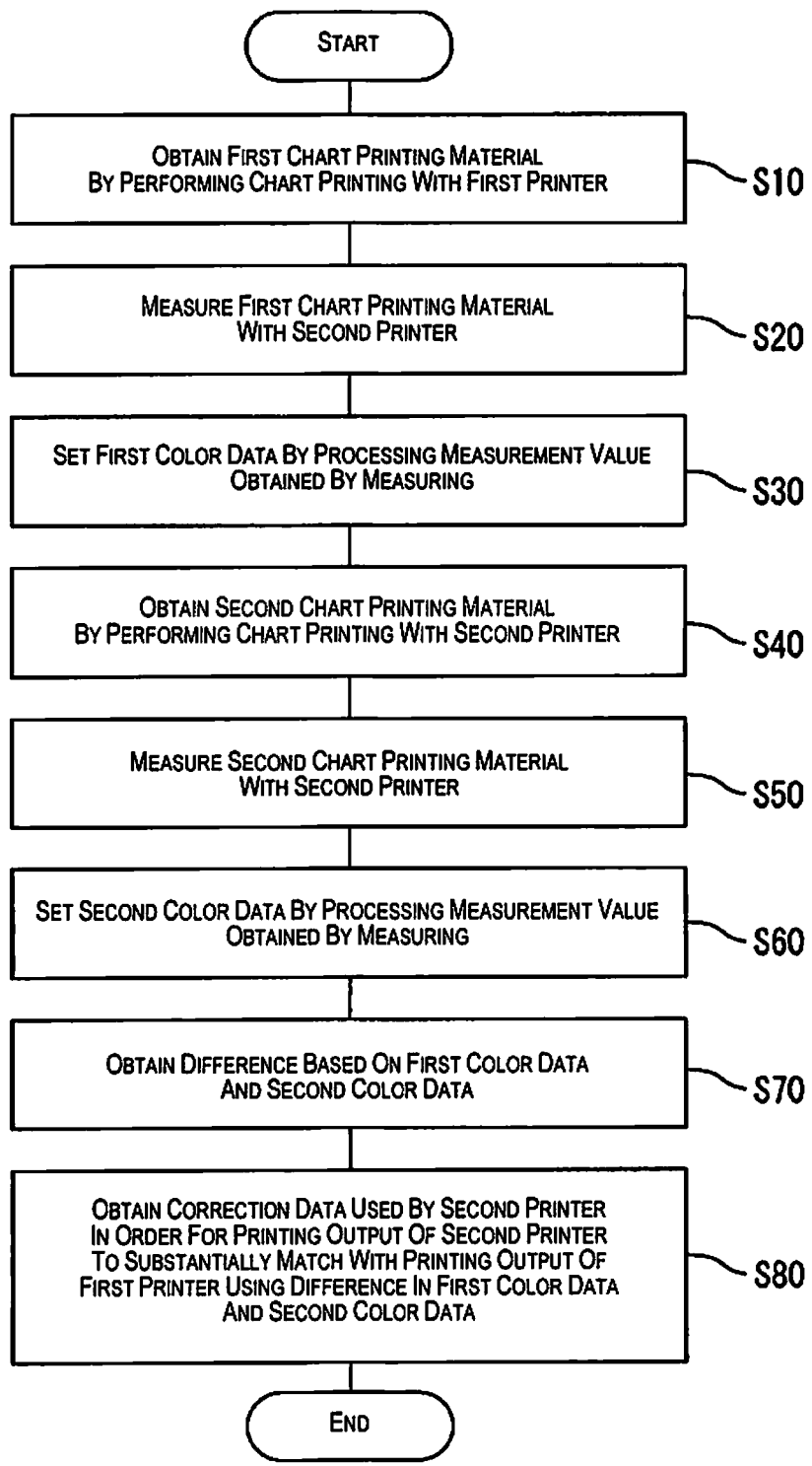
FIG. 10 is a flow chart illustrating a sequence for a printer color calibration method.

Next, FIG. 10 illustrates a sequence for the printer color calibration method using a flow chart.

The sequence for the printer color calibration method will be described below following the flow chart in FIG. 10 while referencing the schematic diagram in FIG. 1. Here, an inner section of a PC is provided with a CPU, a ROM, a RAM, a HDD, various types of I/O interfaces, and the like, and it is possible to execute a program which corresponds to the following processing.

In step S10, a first chart printing material is obtained by chart printing being performed with the first printer A. The PC outputs designated printing data in order to print a chart where a plurality of patches are arranged as described above with regard to the first printer A. Here, the printing data is referred to as a reference value creating chart data and the printing result is referred to as a first chart printing material. A plurality of patches are printed on the medium P as a chart which is printed based on the reference value creating chart data, and position information and color information are stored in the PC to be mapped with each of the patches.

Here, there is a tendency for the printing result to gradually change in the printer itself due to the effects of the passing of time even if the printing data is constant. For this reason, there are often times when processing for correcting the printing data is individually performed in order to eliminate the effects of the passing of time on each of the printers. In the present embodiment, it is sufficient if this processing for correction is executed also using chart printing if the processing for correction of the printing data is performed in order to eliminate the effects of the passing of time as a premise for printing using the first printer A.

When the chart printing with the first printer A is complete, the first chart printing material is measured with the second printer B in step S20. As described above, the first chart printing material is supplied as the medium P, position information is specified based on the control data for the carriage motor 14 and the paper feeding motor 15 in a case of a serial printer, position information is specified based on the control data for the paper feeding motor 15 in a case of a line printer, and a measurement value is obtained by mapping the position information and the density data from the density sensor 12. In this manner, the position information includes the feeding amount of the medium P and the shift movement amount of the carriage where the density sensor is mounted if the printer is a serial printer and includes only the feeding amount of the medium P if the printer is a line printer.

Then, in step S30, first color data is set by processing the measurement value which is obtained by measuring. It is possible to construct color data for each of the patches since the measurement value includes the density data and the position information, and the position information and the color information, which are stored in advance, are stored.

In the present embodiment, the object is to obtain correction data for the second printer B side so as to obtain the same printing result as the printing result of the first printer A. For this reason, the color data, which is constructed based on the density data and the position information which are obtained from the printing result of the first printer A, is set as the measurement value. In other words, the density data which is obtained in step S30 corresponds to the gradient values for each ink and the graphs in FIG. 7 to FIG. 9 are formed.

In the processing up until here, step S10 is equivalent to a step for obtaining the first chart printing material by performing chart printing with the first printer A, and steps S20 and S30 are equivalent to steps where the first color data is set by obtaining the color data using the first chart printing with the second printer B.

Next, in step S40, a second chart printing material is obtained by performing chart printing with the second printer B. The PC outputs designated printing data in order to print a chart where a plurality of patches are arranged in the same manner as the first chart printing material with regard to the second printer B. Here, the printing data is referred to as a correction value creating chart data and the printing result is referred to as a second chart printing material. Here, the correction value creating chart data is the same as the reference value creating chart data. The patches may be printed at positions which are different in practice since it is sufficient if it is possible to measure the same patches by printing the patches which correspond to the same original printing data. In this case, it is acceptable for the correction value creating chart data to be referred to as the same as the reference value creating chart data in practice. Both of these are stored in the PC to map the position information with the color information for each patch.

In addition, it is sufficient if the processing for correction is executed even with chart printing if processing for correction is performed on the printing data in order to eliminate the effects of the passing of time on the second printer B side.

When the chart printing with the second printer B is complete, the second chart printing material is measured with the second printer B in step S50. This measuring is basically the same as a case where the first chart printing material is measured. Here, since the second printer B measures the printing material from the first printer A in step S20, the printing step and the measuring step are clearly differentiated. However, since the second printer B measures its own printing material in step S50, it is possible for the density to be measured using the density sensor 12 after the patches are printed in the step of printing once to correspond to mounting of the density sensor 12. With this meaning, in addition to the case where step S50 is executed after the second chart printing material is completed in step S40, both may be sequentially repeated in patch units or in units of printing steps.

Next, in step S60, second color data is set by processing the measurement value which is obtained by measuring. Here, since the graphs shown in FIG. 7 to FIG. 9 which are references are created in step S30, step S60 is an operation where the gradient values for each patched are obtained based on the obtained density data and the position information by referencing the graphs shown in FIG. 7 to FIG. 9 which are references.

That is, in the case of step S30, color data for each patch is specified based on the position information and the graphs shown in FIG. 7 to FIG. 9 are formed by carrying out an operation where the actual density data which is obtained from the patches is mapped as gradient values for each ink. However, in the case of step S60, an operation, where gradient values for each corresponding ink are obtained, is performed so that the actual density data which is obtained for each patch conforms to the graphs shown in FIG. 7 to FIG. 9. The color data which is constructed for each patch in this manner is the second color data.

If the first color data and the second color data match, there is no color variation between the two devices for the first printer A and the second printer B since the same printing results are obtained with regard to the same printing data. Alternatively, since there is color variation between the two devices if the first color data and the second color data do not match, an operation where correction data, which corrects the printing data at the second printer B side, is obtained so that the same printing result is obtained with regard to the same printing data.

In the processing up until here, step S40 is equivalent to a step for obtaining the second chart printing material by performing chart printing with the second printer B, and steps S50 and S60 are equivalent to steps where the second color data is set by obtaining the color data using the second chart printing with the second printer B.

In step S70, first, a difference is obtained based on the first color data and the second color data. Although not shown in the diagrams, the processing ends if there is no difference. Step S80 is executed in a case where there is a difference.

In step S80, correction data which is used by the second printer B is obtained in order for the printing output from the second printer B to substantially match with the printing output from the first printer A using the difference between the first color data and the second color data. In other words, the correction data is data which corrects the printing data which is input with regard to the second printer B so that the difference is removed based on the differences in the color data for each patch in the second color data and the first color data.

FIG. 11 is a table illustrating an example of differences in the first color data and the second color data. Since the reference values are set based on the printing results from the first printer A, the gradient values in the first color data which is obtained based on the printing data with certain gradient values match the printing data which is input. Then, the gradient values in the second color data, which is obtained based on the relationship which maps the density data and the gradient values which are obtained at this time, deviates from the gradient values in the printing data which is input. In detail, a difference of −5 occurs when mapping the gradient value in the second color data which is 45 with regard to the patch where the gradient value in the first color data is 50, a difference of −10 occurs when mapping the gradient value in the second color data which is 90 with regard to the patch where the gradient value in the first color data is 100, a difference of −10 occurs when mapping the gradient value in the second color data which is 140 with regard to the patch where the gradient value in the first color data is 150, and a difference of −5 occurs when mapping the gradient value in the second color data which is 195 with regard to the patch where the gradient value in the first color data is 200.

This represents obtaining of printing results which are the same as the printing results which are obtained when the printing data is 50 with the first printer A when printing by correcting the printing data which is input into the second printer B from 50 to 45. In this same manner, it is sufficient if the correction data is prepared which corrects the printing data which is input into the second printer B from 100 to 90, the printing data which is input into the second printer B from 150 to 140, and the printing data which is input into the second printer B from 200 to 195.

Figure 12:
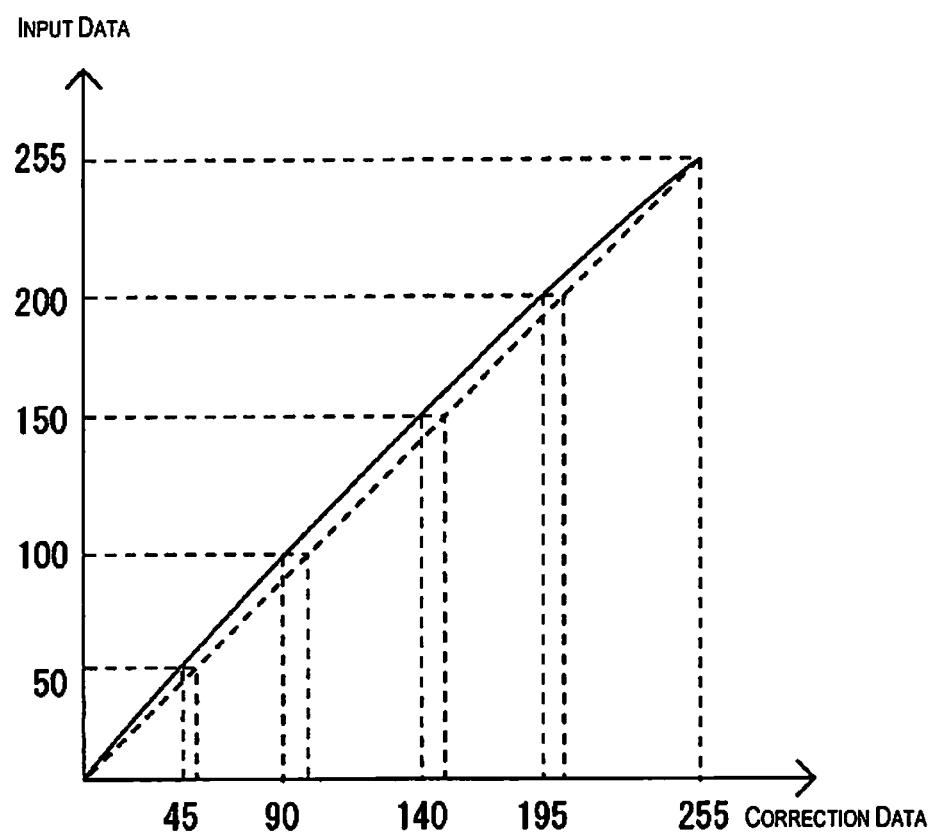
FIG. 12 is a graph illustrating correction data where printing data for a second printer is corrected.

FIG. 12 is a graph illustrating the correction data which corrects printing data for the second printer B.

The graph is shown with the vertical axis as input data and the horizontal data as the correction data, and the graph is created by carrying out interpolation processing so that the correction data is obtained across the entire gradient range of the input data after obtaining a corresponding relationship from patches where the gradient values are sparse. The content which is used in creating the graph is the correction data and is equivalent to a table where the printing data for the second printer B is converted to printing data after correction.

It is possible for the printing results which are obtained from the second printer B to match printing results which are obtained from the first printer A and for color variation between devices to be suppressed to a minimum when a table, which consists of the correction data which is obtained in step S80, is prepared and preprocessing is performed to convert to the printing data after conversion by referencing the table when performing printing with the second printer B.

In addition, for a user, it is possible for color variation between a plurality of devices to be suppressed without purchasing a colorimeter or purchasing a printer which mounted with a sensor which reduces color variation between units since the simple built-in density sensor is used.

In the processing up until here, the steps S70 and S80 are equivalent to a step for obtaining the correction data which is used by the second printer B in order for the printing output from the second printer B to substantially match with the printing output from the first printer A based on the first color data and the second color data.

In addition, it is possible to eliminate the effects of the passing of time on the second printer B which occur after this with the premise that the correction data which is obtained in step S80 is applied.

(Second Embodiment)

The step for obtaining the second color data is executed after the step for obtaining the first color data is executed in the first embodiment, but it is possible for substantially the same printing results as the first printer A to be obtained with the second printer B in the present invention even in a case where the step for obtaining the first color data is executed after the step for obtaining the second color data is executed.

Figure 13:
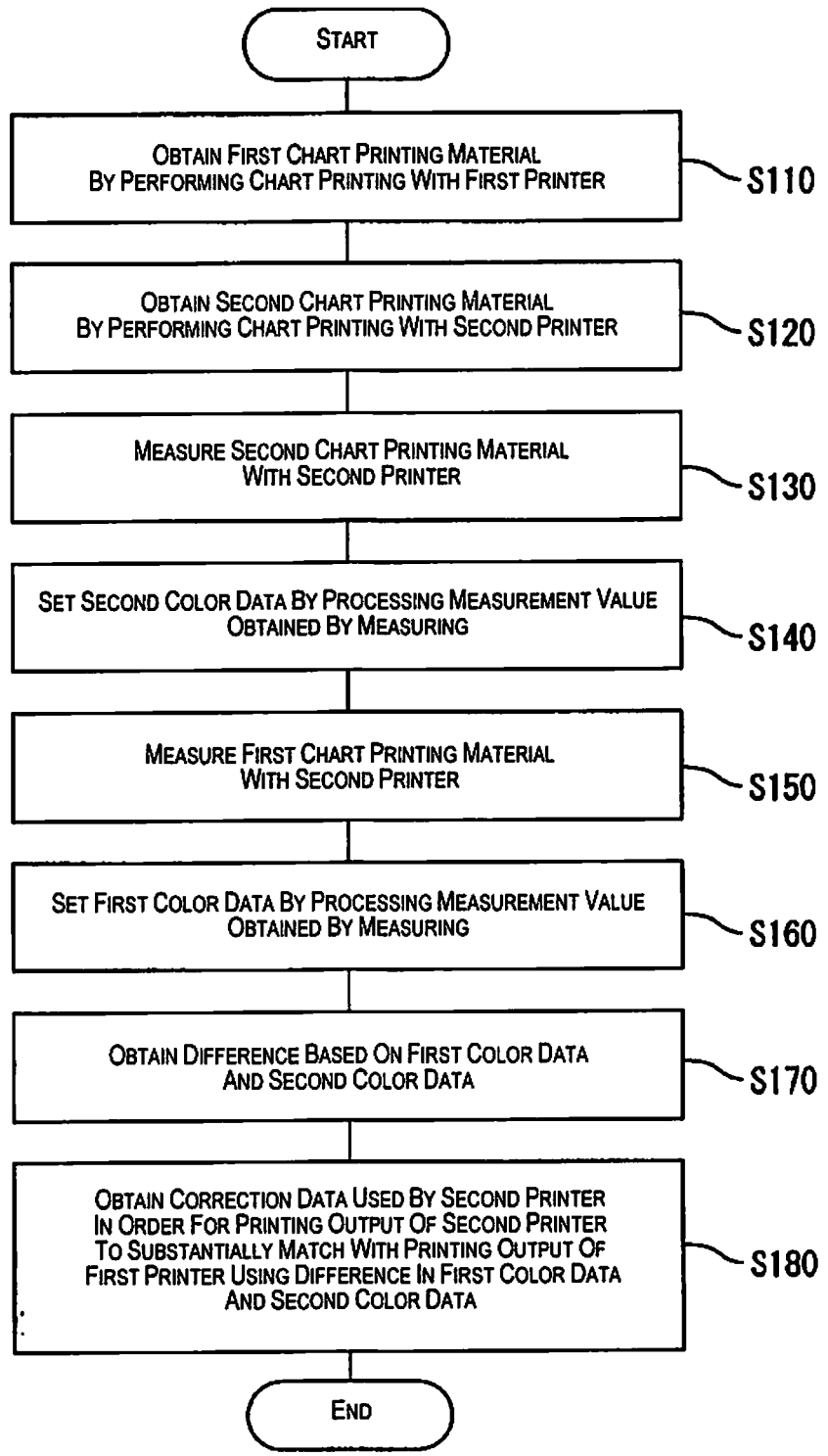
FIG. 13 is a flow chart illustrating a sequence for a printer color calibration method.

FIG. 13 illustrates a sequence for a printer color calibration method in this case using a flow chart.

In step S110, the first chart printing is obtained by performing chart printing with the first printer A.

Next, the second chart printing material is obtained by performing chart printing with the second printer B in step S120, the second chart printing material is measured with the second printer B in step S130, and the second color data is set in step S140 by processing the measurement value which is obtained by measuring.

Step S140 is performing an operation equivalent to step S30 based on the measurement value where the second chart printing material is measured with the second printer B. That is, the color data, which is constructed based on the density data and the position information which are obtained from the printing result from the second printer B, is set as the reference value. That is, the density data which is obtained in step S140 corresponds to the gradient values for each ink and the graphs in FIG. 7 to FIG. 9 are formed. The gradient values for each patch which is obtained is this manner are set as the second color data.

Next, the first chart printing material is measured with the second printer B in step S150 and the first color data is set in step S160 by processing the measurement value which is obtained by measuring. In step S160, an operation which is equivalent to step S60 is performed based on the measurement value where the first chart printing material is measured with the second printer B. Since the graphs shown in FIG. 7 to FIG. 9 where the second color data is the reference are formed in step S140, the gradient values for each patch are obtained in step S160 based on the density data and the position information which is obtained based on the first chart printing material by referencing the graphs shown in FIG. 7 to FIG. 9 which are references. The color data which is constructed for each patch in this manner is the first color data.

In step S170, the difference is obtained based on the first color data and the second color data.

FIG. 14 is a table illustrating the differences in the first color data and the second color data. Since the reference values are set based on the printing result from the second printer B, the gradient values in the second color data which are obtained based on the printing data with certain gradient values match the printing data which is input. Then, the gradient values in the first color data, which is obtained based on the relationship which maps the density data and the gradient values which are obtained at this time, deviates from the gradient values in the printing data which is input.

In detail, a difference of −5 occurs when mapping the gradient value in the first color data which is 45 with regard to the patch where the gradient value in the second color data is 50, a difference of −10 occurs when mapping the gradient value in the first color data which is 90 with regard to the patch where the gradient value in the second color data is 100, a difference of −10 occurs when mapping the gradient value in the first color data which is 140 with regard to the patch where the gradient value in the second color data is 150, and a difference of −5 occurs when mapping the gradient value in the first color data which is 195 with regard to the patch where the gradient value in the second color data is 200.

Figure 15:
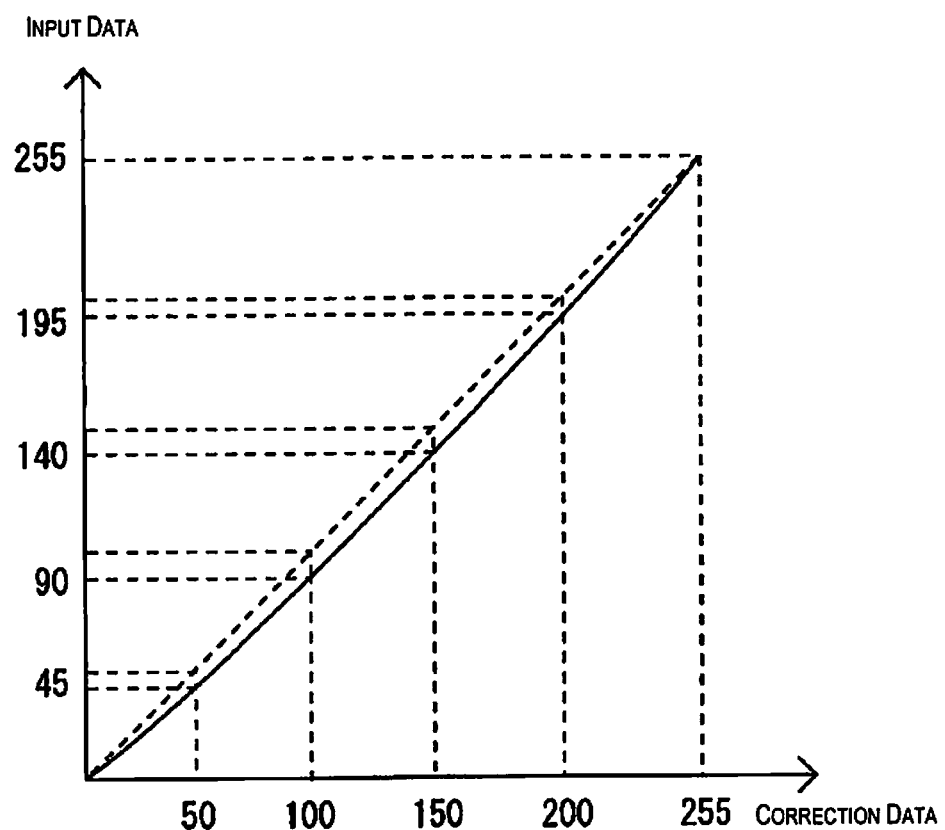
FIG. 15 is a graph illustrating correction data where printing data for a second printer is corrected.

FIG. 15 is a graph illustrating the correction data which corrects the printing data for the second printer B.

The graph is shown with the vertical axis as input data and the horizontal data as the correction data, and the graph is created by carrying out interpolation processing in the same manner as in FIG. 14. Step S180 is equivalent to the processing for creating the graphs. That is, the correction data which is used by the second printer B is obtained in step S180 in order for the printing output from the second printer B to substantially match with the printing output from the first printer A using the difference between the first color data and the second color data.

In detail, the graph is referenced, the input data is a parameter for the first color data, and the value of the second color data is the correction data. It is obvious that the printing data for the second printer B is also equivalent to a table for converting to the printing data after correction.

Then, it is possible for the printing results which are obtained from the second printer B to match printing results which are obtained from the first printer A and for color variation between devices to be suppressed to a minimum when a table, which consists of the correction data which is obtained in step S180, is prepared and preprocessing is performed to convert to the printing data after conversion by referencing the table when performing printing with the second printer B.

Here, it is obvious that the present invention is not limited to the embodiments described above. It would be obvious to a person skilled in the art, but the following are disclosed as embodiments of the present invention.

Applying modifications to appropriate combining of members, configurations, and the like which are disclosed in the embodiments described above and which are able to be interchanged with each other.

Applying modifications to appropriate interchanging or combining of members, configurations, and the like which, although not disclosed in the embodiment described above, are known techniques and disclosed in the embodiments described above and members, configurations, and the like which are able to be interchanged with each other.

Applying modifications to appropriate interchanging or combining of members, configurations, and the like which could be conceived of by a person skilled in the art to replace members, configurations, and the like which, although not disclosed in the embodiment described above, are disclosed in the embodiments described above based on known techniques and the like.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer color calibration method for a printer that is configured to perform chart printing in which designated color patches are printed at a plurality of designated positions on a medium, and that is configured to acquire color data by obtaining color information by measuring each patch using a sensor that detects color information, the method comprising:
    obtaining first chart printing material by performing the chart printing with a first printer;
    setting first color data by obtaining the color data using the first chart printing material with a second printer;
    obtaining second chart printing material by performing the chart printing with the second printer;
    setting second color data by obtaining the color data using the second chart printing material with the second printer; and
    obtaining correction data that is used by the second printer in order for printing output of the second printer to substantially match with printing output of the first printer based on a difference between the first color data obtained using the first chart printing material and the second color data obtained using the second chart printing material, the obtaining correction data including obtaining a correspondence relationship between the first color data and the second color data from patches of a plurality of gradient values using a single color ink and thereafter carrying out interpolation processing to obtain the correction data across an entire gradient range of input data.

2. The printer color calibration method according to claim 1, wherein
    the sensor includes a density sensor that measures density using reflected light when illumination light is irradiated onto a medium at a designated position on the medium.

3. The printer color calibration method according to claim 2, wherein
    the color data is obtained based on position information for each patch and density information for each patch by obtaining position information along with obtaining density information by measuring density for each patch in chart printing using the density sensor while the medium and the density sensor are being moved.

4. The printer color calibration method according to claim 3, wherein
    the position information includes a feeding amount of the medium and a shift movement amount of a carriage to which the density sensor is mounted.

5. The printer color calibration method according to claim 1, wherein
    the correction data is data that corrects printing data that is input with regard to the second printer such that the difference in color data for each patch in the second color data and the first color data is removed.

6. The printer color calibration method according to claim 5, wherein
    the correction data includes a table with which printing data for the second printer is converted into printing data after correction.

7. A printer color calibration method for a printer that includes a density sensor that measures density using reflected light when illumination light is irradiated onto a medium at a designated position on the medium, and that is configured to perform chart printing in which designated color patches are printed at a plurality of designated positions, to obtain density information by measuring density for each patch using the density sensor, and to acquire density data that includes color information of the patches based on position information for each patch and density information for each patch, the method comprising:
    obtaining first chart printing material by performing the chart printing with a first printer;
    setting first density data by obtaining the density data using the first chart printing material with a second printer;
    obtaining second chart printing material by performing the chart printing with the second printer;
    setting second density data by obtaining the density data using the second chart printing material with the second printer; and
    obtaining correction data that is used by the second printer in order for printing output of the second printer to substantially match with printing output of the first printer based on a difference between the first density data obtained using the first chart printing material and the second density data obtained using the second chart printing material, the obtaining correction data including obtaining a correspondence relationship between the first density data and the second density data from patches of a plurality of gradient values using a single color ink and thereafter carrying out interpolation processing to obtain the correction data across an entire gradient range of input data.

* * * * *